A. KADOW.
METHOD OF MAKING BLOWN GLASS ARTICLES.
APPLICATION FILED JULY 6, 1910.
1,021,048.
Patented Mar. 26, 1912.
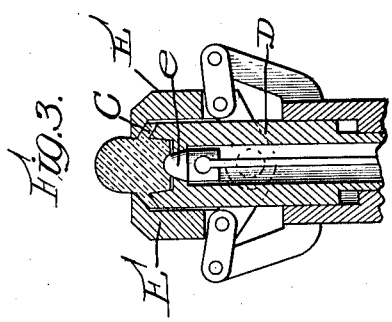
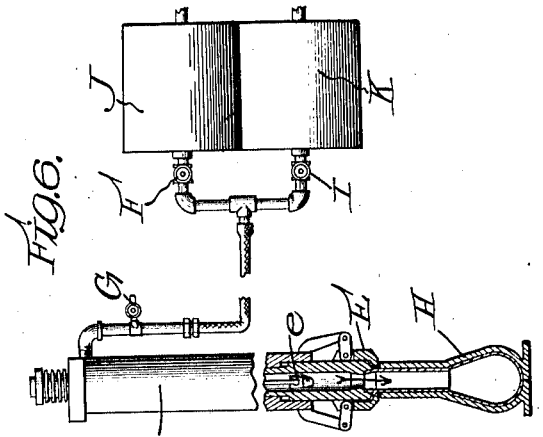
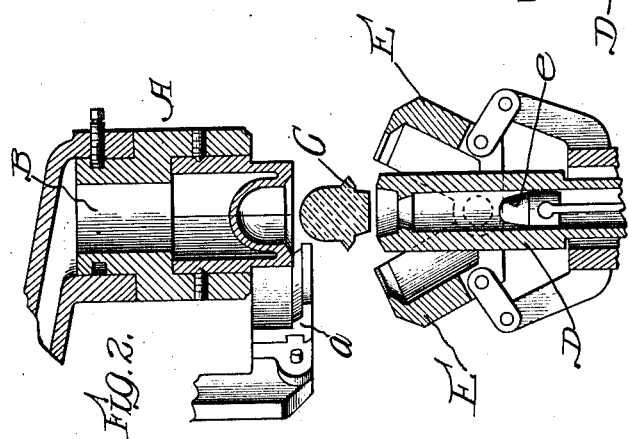
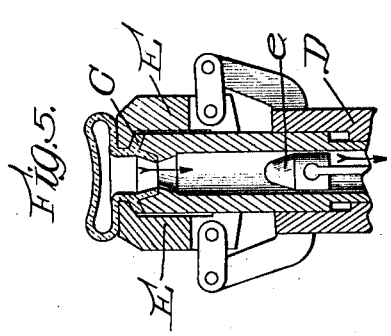
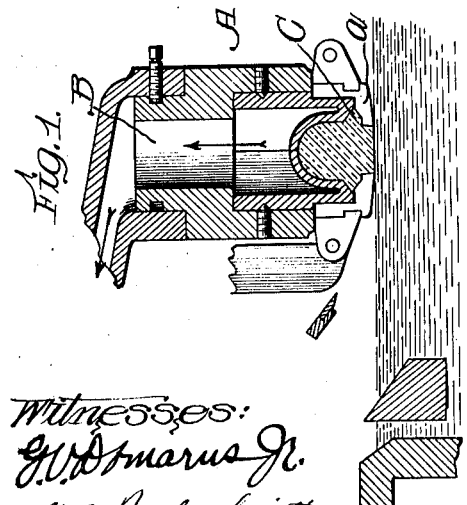
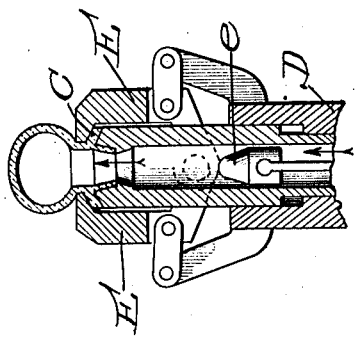

UNITED STATES PATENT OFFICE.

AUGUST KADOW, OF TOLEDO, OHIO, ASSIGNOR TO THE WESTLAKE MACHINE COMPANY, OF TOLEDO, OHIO, A CORPORATION OF OHIO.

METHOD OF MAKING BLOWN-GLASS ARTICLES.

1,021,048.  Specification of Letters Patent.  Patented Mar. 26, 1912.

Application filed July 6, 1910. Serial No. 570,620.

*To all whom it may concern:*

Be it known that I, AUGUST KADOW, a citizen of the United States, residing at Toledo, in the county of Lucas and State of Ohio, have invented certain new and useful Improvements in Methods of Making Blown-Glass Articles, of which the following is a specification.

The object of my invention is to simplify the manufacture of blown glass articles so as to largely eliminate the skill which is necessary in the present methods of manufacturing such articles by hand, and also to so simplify and improve the method of manufacturing blown glass articles as to readily adapt it to be practiced by automatic machinery such, for example, as the machine shown in my co-pending application No. 570,621.

Among the particular objects of my invention are: To manipulate the glass in such a way that the "shear" will not appear in the finished article even when manufactured by unskilled labor. To simplify the process by first gathering the metal in a certain form of definite quantity and then transferring it to the blowing device. To manipulate the metal in the blowing device so as to evenly distribute the heat and to evenly distribute the material. To complete the blowing in molds and to so manipulate the air supply as to prevent either collapse or distortion of the finished article when released by the molds. These and such other objects as may hereafter appear are attained by my invention, the characteristics of which are briefly as follows:

I first collect from the furnace or pot a definite quantity of metal, and preferably of a definite pre-determined form. This can be done by charging any suitable chamber or gathering mold and cutting off the surplus metal and, so far as my present invention is concerned, it matters not whether the gathering chamber is charged by flowing metal into it or by sucking metal into it from the tank by means of a partial vacuum, or by means of differential pressures, or otherwise. The gathering chamber or mold in conjunction with the cut-off device, which may be of any suitable character, automatically measures the exact quantity of metal with which the gathering device is charged and this chamber is preferably of such a contour that the blank formed by the metal gather therein will have the shape which will be most readily worked by blowing into the desired finished form. Preferably also this chamber will form on the blank a shoulder, neck or collar, by which it may be supported in the gathering chamber and by which it may be handled by the other tools used. Having thus gathered a blank of definite quantity and form which has been cut off from the surplus metal by the action of the cut-off device across the intake opening of the gathering device, I next bodily transfer this blank, while still exceedingly hot and plastic, to the blow pipe or blowing device. Preferably this is done by opening the gathering device and allowing the blank to drop by gravity into the open end of the blowing device. By this arrangement the sheared end of the blank is received by the blowing device so that the shear will not appear on the finished article, and the blowing device, being provided with means for clamping the still soft and plastic blank, firmly grips or clasps the blank near one end of it and the blank being still hot and plastic, the clamping action of the blowing device tightly seals the blank to the end of the blowing device, so that no air will escape between the blowing device and the blank and consequently the air to be supplied may be automatically or mechanically measured, with the certainty of producing a certain definite result. At the same time the contact of the metal with the relatively cooled gathering mold and then with the relatively cool blowing device chill the parts of the blank which come in contact with the blowing device sufficiently to keep the blank from adhering to the blowing device. Consequently when clamped by the blowing device, it is detachably sealed thereto. While the blowing device or blow pipe is still in the reverse position in which it received the blank, *i. e.*, with the blank vertically uppermost, I admit air under pressure to the interior of the blow pipe and leading to the blank, so that the blank is somewhat expanded by the air pressure. Preferably before so doing, an initial air chamber is mechanically formed in the sheared end of the blank by a plunger on the inside of the blow pipe. If at this stage an excess of air be admitted to the blow pipe and into the blank, the blank will be unevenly expanded. Consequently I admit a limited and predetermined quantity of air under a predetermined pressure into the interior of the blank, in practice I have successfully used a pressure of ten pounds at this stage, whereby the blank is partially expanded, whereupon I immediately release this air pressure, so that, the blank being still held in vertical position upon the upper end of the blow pipe, the expanded parts of the blank will sink back by gravity toward, but preferably not in contact with, the other parts of the blank, producing a resultant flow and distribution of the metal which enables me to produce a finished article in which the metal is preferably distributed throughout the walls of the article. I believe also that this result is facilitated by thus allowing the expanded and coolest part of the blank to sink back toward the less expanded and hotter parts of the blank, so that there is a reheating effect which facilitates this equal distribution of the metal. Preferably this step of expanding and allowing the blank to sink back is repeated two or three times within a few minutes, each successive puff progressively expanding the blank, and then by swinging out the blow pipe, the blank is elongated and further expanded by air pressure, if desired, and is then inserted in the familiar paste molds, within which it is rotated, while air under relatively high pressure, say from eight to ten pounds, is admitted to the interior of the blank, expanding it fully and evenly within the walls of the molds to the desired shape. Conveniently at this stage I open communication also between the interior of the blow pipe and a source of relatively low pressure, say five to eight ounces. As the expansion of the blank to the full capacity of the mold is completed, I shut off the high pressure air, because the blank may be still somewhat plastic and, if the high pressure is continued after the molds are open, there may be further expansion and distortion of the glass, but, one the other hand, if there is no pressure maintained within the blank when the molds are opened, the rapid cooling and contraction of the air contained within the glass may cause the article to collapse before it is fully set and released from the blow pipe. It is to prevent this that I open communication between the low pressure and the interior of the blow pipe, so that, when the high pressure air is shut off, a pressure will be maintained within the blank sufficient to prevent any collapse of the blank, due to the cooling of the air within it or to any other cause, but insufficient to expand the blank at this stage when the molds are open and no longer support the blank. As the molds are now opened and the blank, which has now been blown to desired form is being further cooled by contact with the external atmosphere, this low pressure is maintained until the blow pipe unclamps and releases the glass article or until the glass is so thoroughly set that there is no longer danger of collapse.

In the accompanying drawings I have shown a simple form of apparatus capable of use in the practice of my process, merely for the purpose of illustrating the foregoing operations, although the more complicated automatic mechanism shown in my co-pending application Serial No. 570,621 is especially adapted to practice this process automatically and on a large scale, and although various other mechanisms may be devised to attain the same results without departing from the practice of my process. And for convenient illustration, in the accompanying drawings I have shown how my process will be practiced in the manufacture of electric light bulbs.

In the accompanying drawings I have indicated for convenient purposes of illustration only so much mechanism as is necessary to understand my process and how it may be practiced, details of mechanism which may be readily understood, which details are not essential in the practice of my process being omitted.
Figure 1 indicates a suitable gathering mechanism dipping into a mass of molten metal or glass and gathering therefrom metal to form a blank. Fig. 2 indicates the gathering mechanism as releasing the blank to the blowing mechanism, the blowing mechanism being in what I have conveniently called reversed position. Fig. 3 shows the end of the blowing mechanism as having clamped the blank to the end of the blowing mechanism while supplemental mechanism forms the initial chamber in the sheared end of the blank. Fig. 4 shows the blank expanded in an upward direction by air admitted through the blowing mechanism. Fig. 5 shows the blank sinking back on itself by gravity as the air pressure is released through the relief valve; and Fig. 6 indicates diagrammatically a simple form of blowing mechanism with control valves, etc., and with the blank fully expanded in the finishing molds.

Like letters of reference indicate the same parts in the several figures of the drawings.
In the accompanying drawings, A indicates the gathering device provided with a pair of hinged neck molds a which may be held in closed relation to each other in any suitable manner, as, for example, by springs or by any adaptable locking device. A passage B in the gathering device communicates with the interior of the molds, and a partial vacuum may be created in this passage, when the neck molds are dipped into a tank of metal, by any suitable means, such mechanism being well known in the art. By means of such partial vacuum created when the neck molds are dipped in a tank of metal, the gathering mechanism will be charged with a quantity of metal which will take the form of the gathering chamber on the interior of the gathering mechanism and, any surplus metal being cut off across the intake opening of the gathering device, the quantity of metal so gathered will, of course, be definite. As the gathering mechanism is withdrawn from the tank, either by hand or otherwise, the partial vacuum in it is destroyed and the blank will be suspended in the gathering mechanism solely by the collar C, which has been formed on it. The blank is now carried over the open end of the inverted blow-pipe D, which is provided with hinged clamping jaws E which may be opened and closed and held closed in any convenient manner. The neck molds are now opened, thereby releasing the soft, hot blank which has been gathered, and allowing it to drop by gravity into the open jaws of the blow pipe. The jaws of the blow-pipe are now closed tightly so as to clamp the collar C of the blank, and the collar C being soft and plastic, it is squeezed tightly in the grip of the blow pipe, so as to form an air tight seal between the blank and the blow-pipe.

Of course, so far as concerns the delivery of the blank by gravity to the working mechanism, it does not matter whether normal pressure behind the blank in the neck molds is restored before or after the mechanical support is removed, although there is less tendency for the blank to be distorted by its own weight if the vacuum is destroyed before withdrawing the mechanical support. However, by properly timing the successive operations, the blank will drop by gravity into the working mechanism as required, whether the mechanical support for the blank be removed immediately before or after destroying the partial vacuum.

A plunger $e$ in the blow-pipe is driven upwardly and axially into the soft blank forming an initial air chamber, and, being withdrawn, a valve F controlling communication between the blow-pipe and a source of air pressure is opened for a definite period and then closed, thereby expanding the blank upwardly. A relief valve G is now opened, thereby relieving air pressure and allowing the blank to sink back upon itself, but, by the timely closing of the relief valve, this sinking back of the expanded portion of the blank is arrested and by opening the air pressure valve F, another puff of air under pressure is admitted into the blank and is again released, and so successively, preferably two or three successive puffs of air, which preferably are of progressively greater volume, so as to increase the expansion of the blank with each successive puff of air. The blow-pipe is now swung down and oscillated, either by hand or by suitable mechanism, until the blank is suitably elongated, more air being admitted to the blank if desired. When the blank has been brought to a shape suitable for insertion in the paste molds, it is inserted in molds H, which are closed about it in any usual manner, and thereupon the blow-pipe is rotated while the high pressure air valve F is opened, and this pressure is maintained for a period sufficient to fully expand the blank within the molds. Thereupon, before opening the molds, the high pressure valve F is closed and the low pressure valve I is opened. Shortly thereafter the molds are opened and, in practice, just before the clamping jaws on the blow-pipe are opened, so as to release and deliver the now completed bulb, the low pressure air valve I is closed. Thereupon the jaws of the blow-pipe are opened and the finished blank is delivered.

It should be understood that the pressures indicated are not arbitrary and are not of the essence of my invention; that these pressures will be varied according to the character and size of the article being made, the character of glass being worked, its temperature, etc., and the number and duration of the intermittent puffs of air admitted to the blank will be varied as experience may dictate. In fact, so far as the air control is concerned, the only feature which is of the essence of my broad invention is the use of air of quite widely varying pressures, one being sufficient to expand the blank as required, and the other being sufficient to support the blank when released from the molds, although still somewhat plastic, but insufficient to appreciably expand it at that stage in the process. Therefore, these and various other matters may be varied as conditions and experience may suggest or require without departing from the spirit of my invention.

I claim:

1. The method of forming hollow glass articles, which consists in forming a blank by gathering a definite quantity of metal directly from a mass of molten glass into the blank forming means, shearing the metal thus gathered from the mass from which it is gathered, delivering the blank bodily from the forming means so as to have the sheared end in engagement with a blowing means, leaving the body free, and then blowing the blank to form.

2. The process of manufacturing glass articles, which comprises gathering the metal in blank forming molds by developing a partial vacuum in said molds and thereby forming a blank provided with a supporting flange, destroying said partial vacuum when said blank has been formed, delivering said blank from said molds to a working mechanism by causing said molds to disengage the flange on said blank, sealing the plastic blank in the working mechanism by compressing said flange between parts of the working mechanism, and then developing the blank to desired form by the operations of the working mechanism.

3. The process of manufacturing glass articles, which comprises gathering the metal in blank forming molds by means of a partial vacuum in said molds and thereby forming a blank provided with a supporting flange, destroying said partial vacuum when said blank has been formed, delivering said blank from said molds to a working mechanism by removing the supporting means engaging the flange on said blank, detachably sealing the plastic blank in the working mechanism by compressing said flange between parts of the working mechanism, then mechanically developing a chamber in said blank through the sheared end thereof, and blowing air under pressure into the chamber so developed in said blank.

4. The method of forming glass articles, which comprises supporting a plastic blank in vertical position, expanding the blank upwardly by successive puffs of air under pressure, relieving said air pressure after each puff and while the blank is in vertical position, whereby the expanded portions of the blank are allowed to settle downwardly between successive puffs, and then developing the blank to desired form.

5. The method of forming glass articles, which comprises supporting a plastic blank in vertical position, expanding the blank upwardly by successive puffs of air under pressure and of successively larger volume, relieving the air pressure after each puff and while the blank is in vertical position, whereby the expanded portions of the blank are allowed to settle downwardly between successive puffs, and then blowing the blank to form.

6. The method of making glass articles, which comprises blowing a plastic blank to final form in molds under a relatively high air pressure, shutting off said high air pressure and maintaining relatively low pressure in the interior of the blank before releasing the blank from the molds and when the blank has set sufficiently to no longer expand under such low pressure, and continuing such low pressure until the blank has set sufficiently to prevent collapse thereof when delivered from the working mechanism.

7. The method of producing glass articles, which comprises forming the metal into a blank, supporting the blank, while still exceedingly hot and plastic, in an upwardly extending vertical position, blowing air under pressure to the interior of the blank in successive puffs while so supported, relieving the air pressure between each puff, whereby the expanded parts of the blank are allowed to settle back, further developing the blank under compressed air, inclosing the blank within a mold, blowing the blank to form under high pressure, shutting off the high pressure and maintaining the relatively low pressure in the blank until the molds release the blank and the blank is set, said low pressure being insufficient to expand the blank after it is released by the molds, but being sufficient to support the blank against collapse.

8. The process of manufacturing glass articles, which comprises forming a blank directly from a mass of molten glass, shearing the blank from said mass, entirely disengaging the blank from the mechanism in which it has been gathered and formed, and transferring it bodily to the blowing end of the blowing mechanism, and detachably sealing the sheared end of the blank, while still in plastic condition, to the blowing end of said blowing mechanism, and then blowing the blank to form.

9. The process of manufacturing blown glass articles at one heat, which comprises gathering a definite quantity of metal to definite form, bodily transferring the metal so gathered to blowing mechanism, and mechanically blowing and developing the blank to desired form by the operation of the blowing mechanism.

10. The process of mechanically producing blown glass articles at one heat, which comprises gathering a definite quantity of metal to definite form from a mass of molten metal, shearing the metal so gathered from the mass, bodily transferring the gathered metal to the blowing mechanism, detachably sealing the sheared end of the gather to the blowing mechanism and then blowing and developing the blank to form by the operation of the blowing mechanism.

11. The process of mechanically producing glass articles, which comprises gathering the blank into a forming mold from a mass of molten glass by means of a partial vacuum, so as to cause the blank to be formed upon a mechanical support, delivering the blank by gravity to working means by removing the mechanical support and destroying the partial vacuum, detachably securing the blank when so delivered to the working means, and then developing the blank to form.

12. The process of mechanically producing glass articles, which comprises gathering the blank into a forming mold from a mass of molten glass by means of a partial vacuum, so as to cause the blank to be formed upon a mechanical support, delivering the blank by gravity to working means by destroying the partial vacuum and removing the mechanical support, detachably sealing the blank to the working means by circumferentially compressing the plastic blank to form an air tight seal with the working means, and then developing the blank to form by manipulation of the working means and by pneumatic pressure applied to the interior of the blank through the working means.

AUGUST KADOW.

Witnesses:
John N. Runkel,
J. D. Robinson.